(12) United States Patent
Wu et al.

(10) Patent No.: US 9,709,214 B2
(45) Date of Patent: Jul. 18, 2017

(54) BRACKET AND LIFTING/LOWERING DEVICE ASSEMBLY

(71) Applicant: MSA Technology, LLC, Cranberry Township, PA (US)

(72) Inventors: Jeffrey Wu, Jiangsu (CN); Eleen Ma, Jiangsu (CN); Wade Li, Jiangsu (CN); Anna Zhou, Jiangsu (CN)

(73) Assignee: MSA Technology, LLC, Cranberry Township, PA (US)

( * ) Notice: Subject to any disclaimer, the term of this patent is extended or adjusted under 35 U.S.C. 154(b) by 19 days.

(21) Appl. No.: 14/768,075

(22) PCT Filed: Mar. 14, 2013

(86) PCT No.: PCT/US2013/031271
§ 371 (c)(1),
(2) Date: Aug. 14, 2015

(87) PCT Pub. No.: WO2014/137360
PCT Pub. Date: Sep. 12, 2014

(65) Prior Publication Data
US 2015/0369421 A1    Dec. 24, 2015

(30) Foreign Application Priority Data
Mar. 8, 2013   (CN) .......................... 2013 1 0087396

(51) Int. Cl.
*A47B 96/06*   (2006.01)
*F16M 13/02*   (2006.01)
*B66C 5/02*    (2006.01)
*B66F 13/00*   (2006.01)
*A62B 1/06*    (2006.01)

(52) U.S. Cl.
CPC ............. *F16M 13/02* (2013.01); *B66C 5/025* (2013.01); *B66F 13/00* (2013.01); *A62B 1/06* (2013.01); *Y10T 29/49828* (2015.01)

(58) Field of Classification Search
USPC ....................................... 248/205.1
See application file for complete search history.

(56) References Cited

U.S. PATENT DOCUMENTS 2,507,363 A    5/1950  Baker
3,759,346 A *  9/1973  Brda ........................ A62B 1/14
                                              182/7

(Continued)

FOREIGN PATENT DOCUMENTS

CN      102631756 A     8/2012
CN      102728014 A    10/2012
WO        9819099 A1    5/1998

*Primary Examiner* — Monica Millner
(74) *Attorney, Agent, or Firm* — The Webb Law Firm

(57) ABSTRACT

A bracket for attaching a lifting/lowering device to a support member of a safety structure, the bracket including: a body configured to at least partially contact or envelop a support member of a safety structure, wherein at least one surface of the body has at least one cut-out that includes at least one shaped end for contacting a support member pin inserted into the support member of the safety structure, and wherein the body includes at least one surface for mounting or securing the bracket to a lifting/lowering device. A bracket and lifting/lowering device assembly and method of installation are also disclosed.

17 Claims, 9 Drawing Sheets

(56) References Cited

U.S. PATENT DOCUMENTS

| | | | | |
|---|---|---|---|---|
| 3,807,696 A * | 4/1974 | Brda | ............... | A62B 1/14 |
| | | | | 182/192 |
| 4,589,523 A | 5/1986 | Olson et al. | | |
| 4,660,679 A * | 4/1987 | Ostrobrod | ............... | B66C 5/025 |
| | | | | 116/202 |
| 5,022,489 A * | 6/1991 | Sauber | ............... | B66C 5/025 |
| | | | | 182/145 |
| 5,217,084 A * | 6/1993 | Olson | ............... | A62B 1/10 |
| | | | | 182/234 |
| 5,348,116 A * | 9/1994 | Pickering | ............... | A62B 1/14 |
| | | | | 182/192 |
| 5,431,248 A * | 7/1995 | Willaughby | ............... | A62B 1/08 |
| | | | | 182/142 |
| 5,762,297 A * | 6/1998 | Ascherin | ............... | B64D 1/22 |
| | | | | 244/137.1 |
| 5,975,488 A | 11/1999 | Imhof et al. | | |
| 6,050,548 A | 4/2000 | Leger | | |
| 6,059,266 A * | 5/2000 | Ascherin | ............... | B64D 1/22 |
| | | | | 242/397.5 |
| 6,283,455 B1 * | 9/2001 | Ascherin | ............... | B64D 1/22 |
| | | | | 242/397.5 |
| 7,381,173 B2 * | 6/2008 | Planke | ............... | A63B 7/02 |
| | | | | 24/130 |
| 7,658,264 B2 * | 2/2010 | Mauthner | ............... | A62B 1/14 |
| | | | | 182/5 |
| 7,699,292 B2 * | 4/2010 | Barnett | ............... | B66C 23/166 |
| | | | | 212/292 |
| 8,038,031 B2 * | 10/2011 | DePietro | ............... | B65D 90/10 |
| | | | | 16/382 |
| 9,174,073 B2 * | 11/2015 | Casebolt | ............... | A62B 35/0025 |
| 2003/0075711 A1 | 4/2003 | Cook et al. | | |
| 2009/0146119 A1 * | 6/2009 | Bailey | ............... | B66D 1/12 |
| | | | | 254/323 |
| 2009/0194366 A1 * | 8/2009 | Parker | ............... | A62B 35/04 |
| | | | | 182/3 |
| 2010/0242296 A1 * | 9/2010 | Camp | ............... | B66C 1/125 |
| | | | | 33/701 |
| 2013/0104351 A1 * | 5/2013 | Casebolt | ............... | A62B 35/0037 |
| | | | | 24/522 |
| 2013/0104374 A1 * | 5/2013 | Schlangen | ............... | F16B 45/02 |
| | | | | 29/525.01 |

* cited by examiner

BRACKET AND LIFTING/LOWERING DEVICE ASSEMBLY

CROSS-REFERENCE TO RELATED APPLICATIONS

This application is the United States national phase of International Application No. PCT/US2013/031271 filed Mar. 14, 2013, and claims priority to Chinese Patent Application No. 201310087396.3 filed Mar. 8, 2013, the disclosures of which are hereby incorporated in their entirety by reference.

BACKGROUND OF THE INVENTION

Field of the Invention

The invention relates generally to a mounting apparatus for a lifting/lowering device used in conjunction with a safety structure to lift, lower, or position individuals or materials in a confined space.

Description of Related Art

Several different apparatuses and arrangements are currently used for the lowering, lifting, or positioning of an individual or materials in a confined space. Often a tripod is used as a safety structure that is positioned around a hole or opening to a confined space. A winch or other lifting/lowering device is attached to the safety structure and used for materials handling, transportation of individuals, positioning individuals to perform work at a certain position, or emergency rescue and evacuation. Many apparatuses mount the winch to a support member of the safety structure to allow easy, accessible operation of the winch by individuals at opening to the confined space.

One known existing arrangement is the MSA Lynx Confined Space Entry Kit, which includes two pins to mount the lifting/lowering device to the support member of the safety structure. One pin is used to set the telescoping support member at a desired height and another pin is used to secure a bracket mounted on the support member to the lifting/lowering device.

SUMMARY OF THE INVENTION

Generally, the present invention provides an improved bracket and lifting/lowering device assembly. Preferably, the present invention provides a bracket and lifting/lowering device assembly that is easier to install and lower in cost. Preferably, the present invention also provides a bracket and lifting/lowering device assembly increases safety compliance at the worksite, and increases the effectiveness of a fall protection arrangement, resulting in greater safety to a user in the event of a fall.

According to one preferred and non-limiting embodiment of the present invention, a bracket is provided for attaching a lifting/lowering device to a support member of a safety structure. The bracket includes a body adapted to at least partially contact or envelop a support member of a safety structure. At least one surface of the body has at least one cut-out that includes at least one shaped end for contacting a support member pin inserted into the support member of the safety structure. The body further includes at least one surface for securing the bracket to a portion of a lifting/lowering device.

In another preferred and non-limiting embodiment, a bracket and lifting/lowering device assembly for use with a safety structure is provided, including a bracket as described above, a lifting/lowering device, and a support member of a safety structure, wherein the support member includes at least two segments arranged telescopically together and secured together by inserting the support member pin into mounting holes of the segments, and wherein the bracket slides upwardly on the support member to position the support member pin at least partially in the shaped end of the at least one cut-out and a hole in a portion of the lifting/lowering device.

In another preferred and non-limiting embodiment of the present invention, the at least one cut-out has two shaped ends to provide a safety catch for when the lifting/lowering device is displaced from the support member after the support member pin is dislodged. This assembly utilizes the support member pin to mount the assembly on the support member, as opposed to current assemblies that use the support member pin and an additional pin to attach the bracket to the lifting/lowering device.

In a further preferred and non-limiting embodiment of the present invention, provided is a method of installing a bracket and lifting/lowering device assembly on a support member of a safety structure, which includes installing at least a portion of the length of a support member pin into at least one mounting hole of a support member of a safety structure, mounting a bracket and lifting/lowering device assembly, as discussed above, to the support member, sliding the bracket and lifting/lowering device assembly upwardly on the support member to allow the support member pin to slide at least partially into a shaped end of the at least one cut-out of the bracket, and further inserting the support member pin through the mounting hole and a hole on a portion of the lifting/lowering device.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
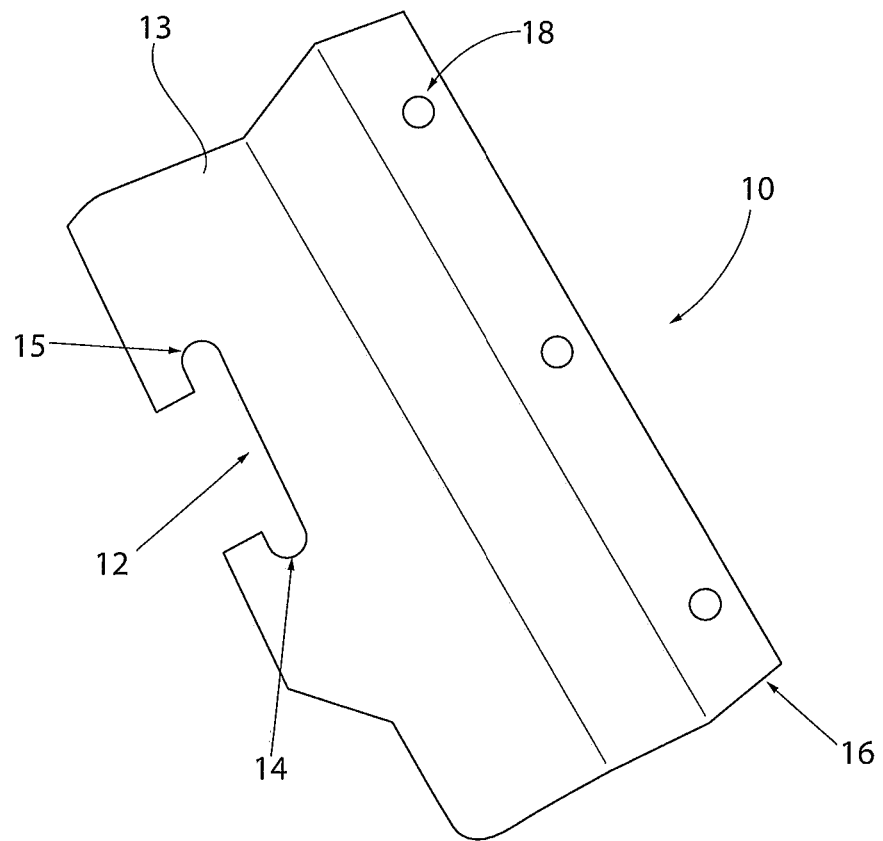
FIG. 1 is a perspective view of one embodiment of a bracket used for mounting a lifting/lowering device to a support member of a safety structure according to the present invention.

For purposes of the description hereinafter, the terms "upper," "lower," "right," "left," "vertical," "horizontal," "top," "bottom" and derivatives and equivalents thereof shall relate to the invention as it is oriented in the drawing figures. However, it is to be understood that the invention may assume various alternate variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

FIG. 1 illustrates one preferred and non-limiting embodiment of a bracket 10 used for mounting a lifting/lowering device 20 to a support member 32 of a safety structure 90. The bracket 10 (or mounting member) includes a body 13 with several surfaces that at least partially cover or envelop a support member of a safety structure. In one preferred and non-limiting embodiment, the body 13 is rectangular in shape; however, the body 13 is designed to reflect the shape of the support member 32 to which the bracket 10 will be attached. The body 13 may be cylindrical in shape for use with a support member that is also cylindrical in shape, or any shape that corresponds to the shape of a support member 32.

While in one preferred and non-limiting embodiment, the body 13 of the bracket 10 includes at least two surfaces, it is envisioned that the body 13 may include additional surfaces to provide greater stability to the bracket 10 when mounted to the support member 32. The body 13 includes at least one surface for securing or mounting the bracket 10 to a lifting/lowering device 20. This surface can be sized, configured, and/or shaped to facilitate interaction and/or direct or indirect contact between the bracket 10 and the lifting/lowering device 20. In one preferred and non-limiting embodiment, this surface of the body 13 includes or is in the form of a flange 16 for securing or mounting the bracket 10 to the lifting/lowering device 20. In this embodiment, the flange 16 includes multiple bracket holes 18 that are used to insert fasteners 19 therethrough to attach the bracket 10 to a lifting/lowering device 20. The surface adjacent to the surface with the flange 16 includes at least one cut-out 12 used for retaining a support member pin 30. According to one preferred and non-limiting embodiment of the present invention, the cut-out 12 has two shaped, opposing ends 14, 15. The cut-out 12 may be centrally located on a peripheral edge of one of the surfaces of the body 13 of the bracket 10.

Additional arrangements for the cut-out 12 are also possible, including positioning the cut-out 12 in the middle of the body 13 of the bracket 10. The shaped ends 14, 15 of the cut-out 12 can be several shapes including rounded, beveled, angled, contoured, and the like. Also, multiple cut-outs 12 can be used within the scope and context of the present invention. In another preferred and non-limiting embodiment, the cut-out 12 includes only a single shaped end 14 for at least partially retaining or contacting the support member pin 30.

Figure 2:
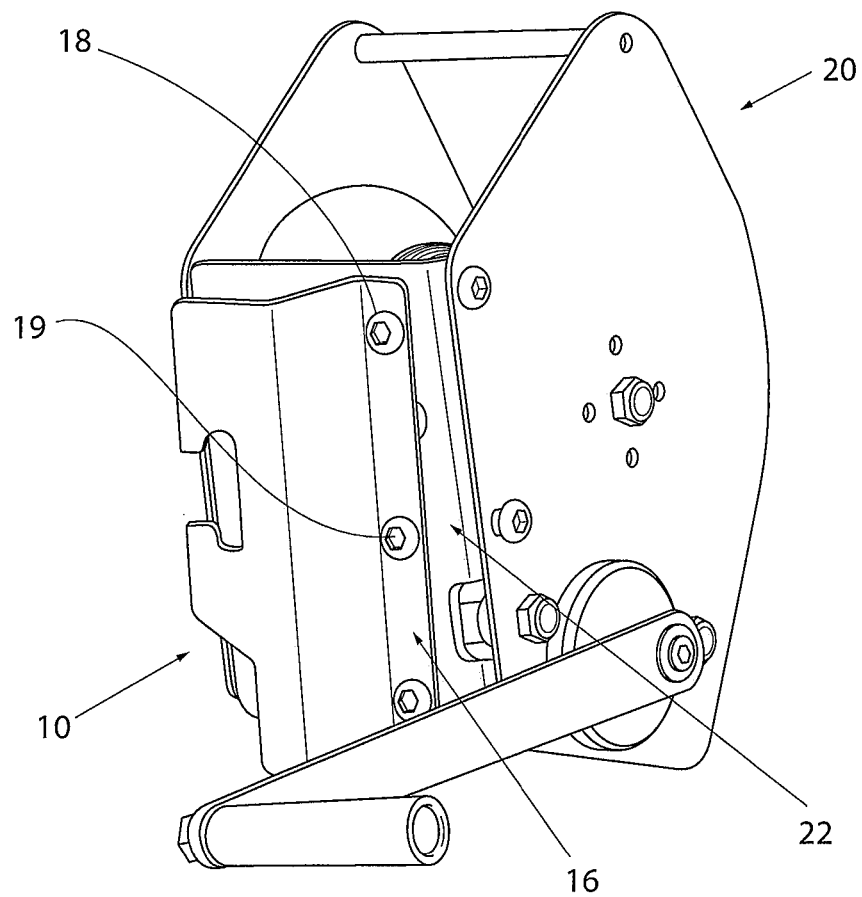
FIG. 2 is a perspective view of one embodiment of a bracket and lifting/lowering device assembly according to the present invention.

FIG. 2 illustrates another preferred and non-limiting embodiment of a bracket 10 attached to a lifting/lowering device 20 in accordance with the present invention. In this embodiment, the bracket 10 has been attached to the lifting/lowering device 20 by inserting fasteners 19 through the bracket holes 18 and into a portion 22 of the lifting/lowering device 20. According to one preferred and non-limiting embodiment, the lifting/lowering device 20 is a winch used to lift and lower individuals into tight, confined spaces. This lifting/lowering device 20 may be any device used to allow an object to ascend or descend, including but not limited to, a hoister, a winder, or a simple pulley system similar to those used in confined space operations. In one preferred and non-limiting embodiment of the present invention, the lifting/lowering device 20 includes a length of rope or cable, a drum around which to wrap the rope or cable, and a crank handle to allow an individual to wind in or wind out the rope or cable to lift or lower the object harnessed on the end of the rope or cable.

Figure 3:
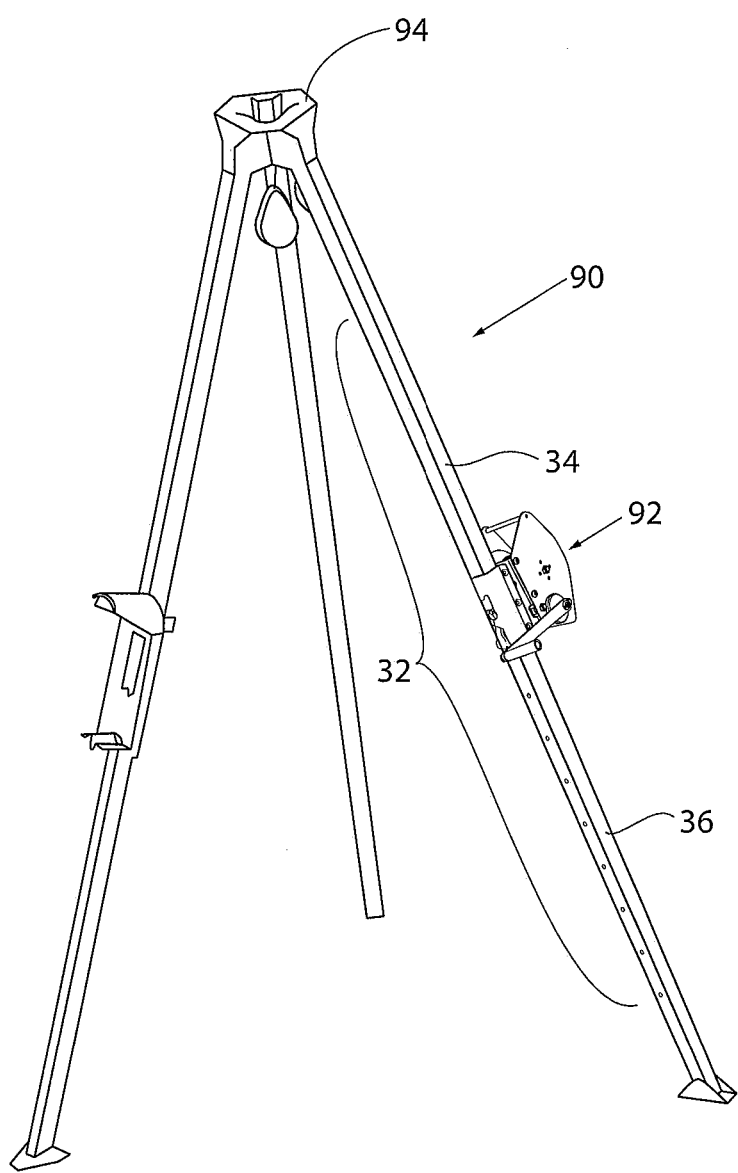
FIG. 3 is a perspective view of one embodiment of a bracket and lifting/lowering device assembly mounted on a support member of a safety structure according to the present invention.

FIG. 3 illustrates another preferred and non-limiting embodiment of a bracket and lifting/lowering device assembly 92 mounted on the safety structure 90 in accordance with the present invention. In this embodiment, the bracket and lifting/lowering device assembly 92 is mounted on a support member 32 of the safety structure 90. In one preferred and non-limiting embodiment of the present invention, the safety structure 90 is a tripod. This safety structure 90 is usually positioned over a hole or opening and is used to lower and lift an individual or materials into and out of the hole. The individuals or materials are attached by a harness to the end of the rope or cable that is coiled inside the lifting/lowering device 20. The safety structure 90 typically has three support members 32; however, the safety structure 90 could have additional support members, if needed. In the illustrated embodiment, the support members 32 are of a rectangular shape. Different configurations and shape of support members 32 can also be used, including cylinders, triangular shapes, and the like. The support members 32 extend downwardly at an angle from a central housing unit 94 and are set upon or engaged with a flat surface around the hole. The rope or cable used in the winch 20 is directed through the central housing unit 94 and down along or through the support member 32 and into the winch 20. In one preferred and non-limiting embodiment, the bracket and lifting/lowering device assembly 92 is positioned on the longitudinal axis of the support member 32, which reduces the friction placed on the rope or cable as a user winds in or winds out the rope or cable to lift or lower the individual or materials.

Figure 4:
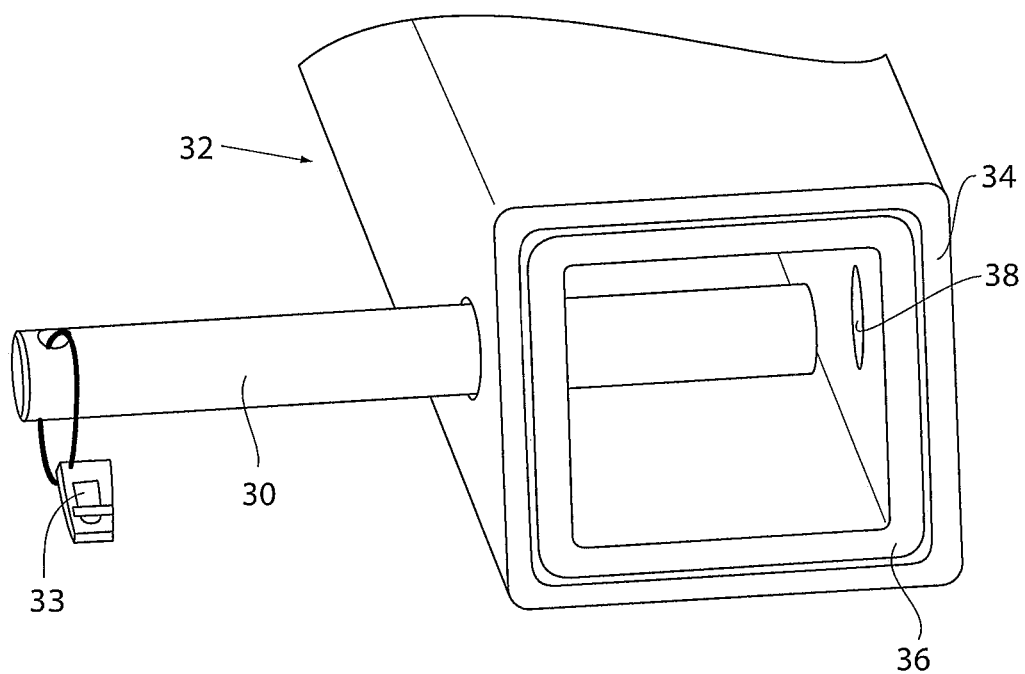
FIG. 4 is a cross-sectional view of one embodiment of a support member with a mounting pin inserted partially therein.

FIG. 4 illustrates a cross-section of the support member 32 and the insertion of a support member pin 30 therein in accordance with a preferred and non-limiting embodiment of the present invention. In this embodiment, the support member 32 includes two separate support member segments, namely an upper support member segment 34 and a lower support member segment 36. The upper support member segment 34 has a top portion positioned in the central housing unit 94 and a lower portion interconnected with the lower support member segment 36. The lower support member segment 36 has a top portion interconnected with the upper support member segment 34 and a bottom portion that is planted on or engaged with a flat surface. The upper support member segment 34 and the lower support member segment 36 have a telescopic relationship, with the upper support member segment 34 overlapping the lower support member segment 36.

With continued reference to FIG. 4, and in this preferred and non-limiting embodiment, both of the support member segments 34, 36 have mounting holes 38 on opposing surfaces of each segment 34, 36. A support member pin 30 is configured for at least partial insertion into and through the aligned mounting holes 38 to position the support member 32 at a desired height. The upper support member segment 34 and the lower support member segment 36 can be moved axially in relation to one another to either increase or decrease the length and height of the support member 32. Several mounting holes 38 are included at intervals along the upper and lower support member segments 34, 36. A user can choose the desired height of the safety structure 90 and adjust the support members 32 accordingly. The user aligns the mounting holes 38 on both of the upper support member segment 34 and the lower support member segment 36, and inserts the support member pin 30 to secure the support member 32 at the desired height. In this embodiment, the support member pin 30 includes an attachment member 33 for securing the support member pin 30 to the support member 32 of the safety structure 90. The attachment member 33 allows the support member pin 30 to remain secured to the support member 32 when not being used to secure the height of the safety structure 90. The attachment member 33 can be a chain, rope, ring, or any other suitable structure to secure the support member pin 30 to the support member 32 when not in use.

Figure 5:
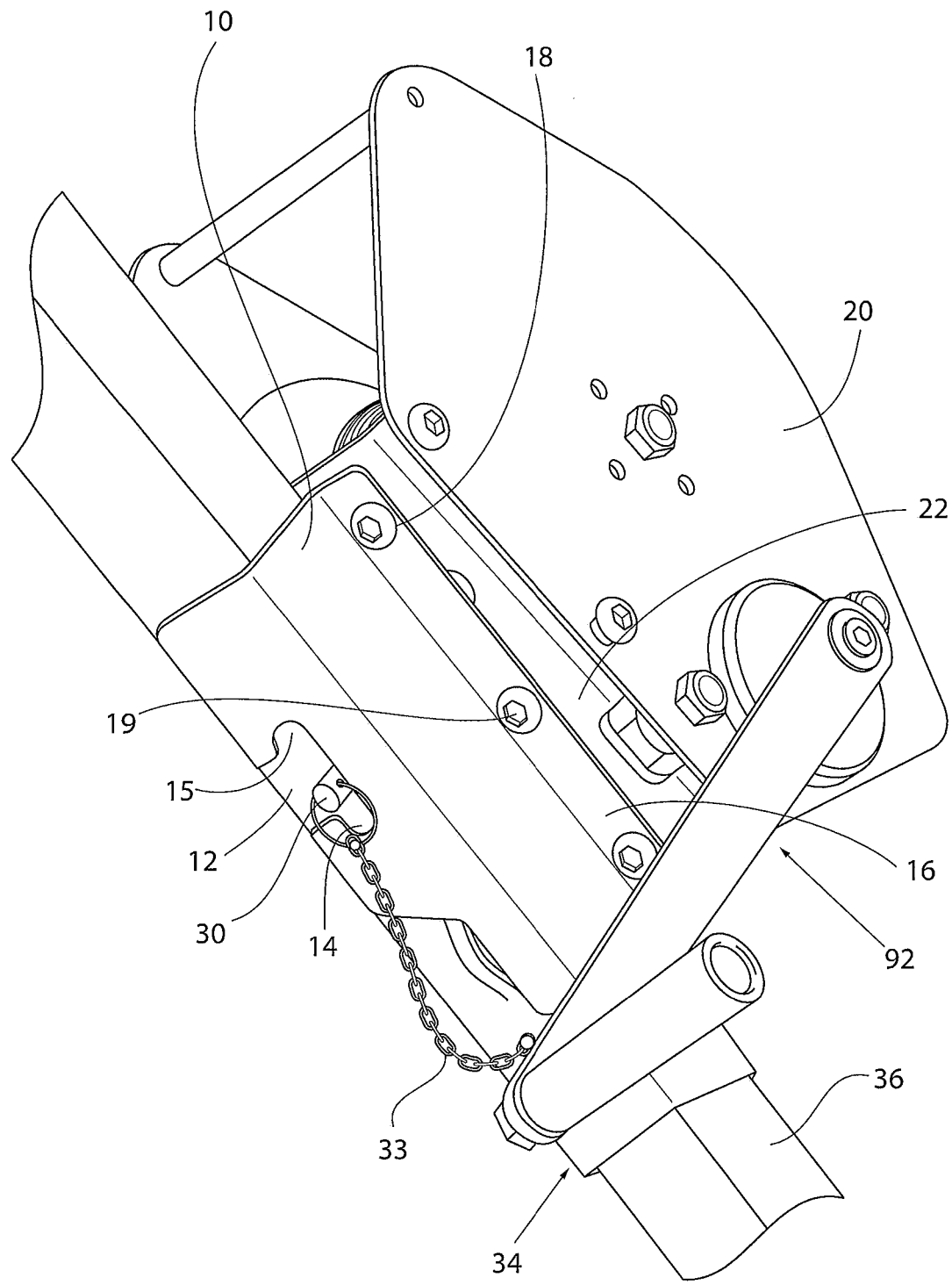
FIG. 5 is a perspective view of one embodiment of a bracket and lifting/lowering device assembly mounted to a support member of a safety structure according to the present invention.

FIG. 5 illustrates the bracket and lifting/lowering device assembly 92 mounted on the support member 32 of the safety structure 90 before being engaged with a support member pin 30, in accordance with another preferred and non-limiting embodiment of the present invention. In this embodiment, at least a portion of the support member pin 30 is inserted into the mounting holes 38 of the upper and lower support member segments 34, 36. After insertion of the support member pin 30, the bracket and lifting/lowering device assembly 92 is mounted on the support member 32 below the support member pin 30. The lifting/lowering device 20 is positioned on the exterior side of the support member 32 and safety structure 90, with a portion 22 of the lifting/lowering device 20 resting on or abutting a surface of the support member 32. The bracket and lifting/lowering device assembly 92 is positioned such that the support member pin 30 is substantially centrally aligned with the cut-out 12 of the bracket 10.

Figure 6:
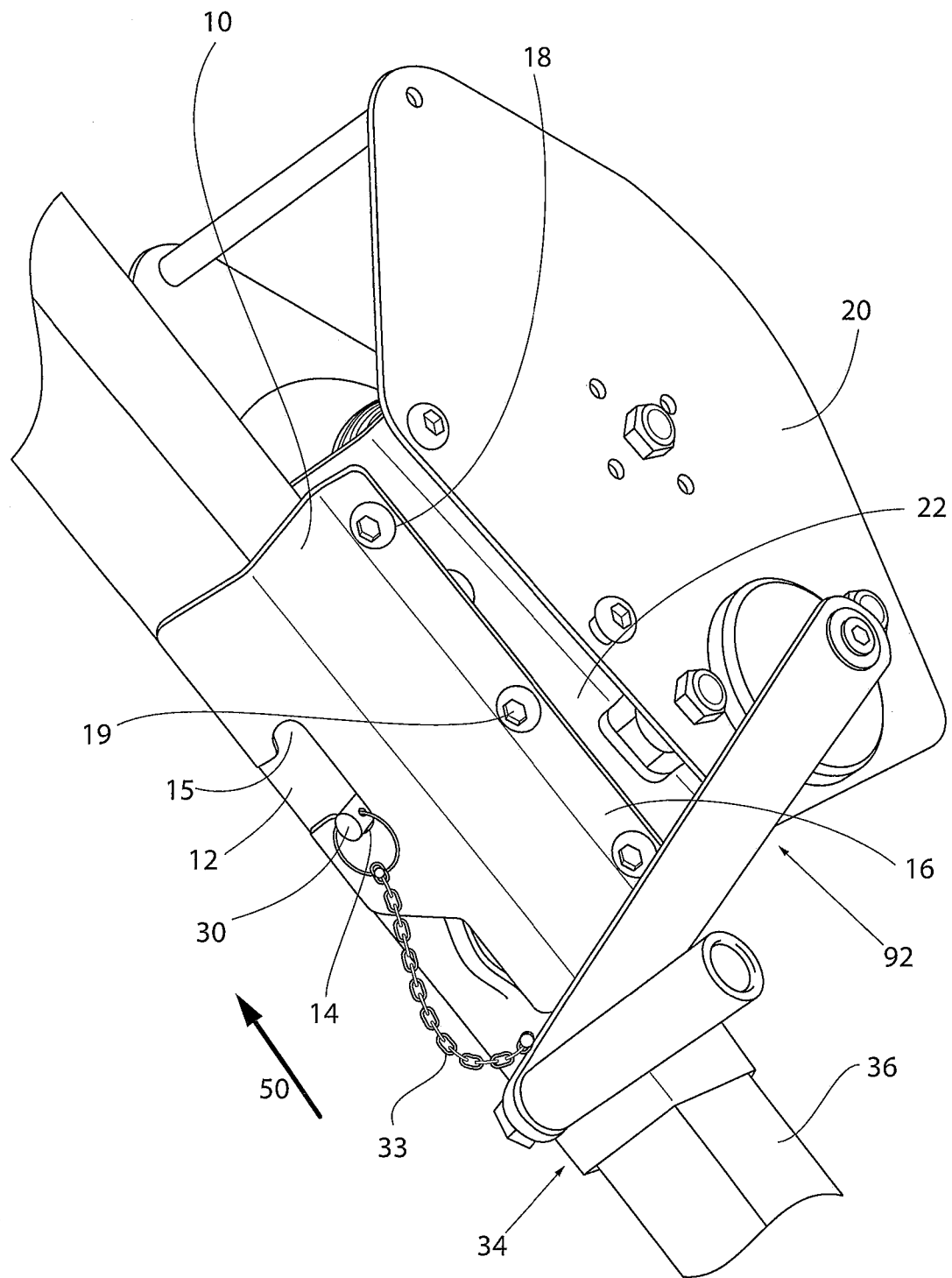
FIG. 6 is a perspective view of one embodiment of a bracket and lifting/lowering device assembly sliding along a support member of a safety structure according to the present invention.

FIG. 6 illustrates the engagement of the bracket and lifting/lowering device assembly 92 with the support member pin 30 of the support member 32 of the safety structure 90 in accordance with one preferred and non-limiting embodiment of the present invention. In particular, and in this embodiment, the bracket and lifting/lowering device assembly 92 is moved on the support member 32 in an upward direction 50. By moving the bracket and lifting/lowering device assembly 92 in this direction 50, the support member pin 30 engages with the shaped end 14 of the cut-out 12 on the bracket 10. By placing or positioning the support member pin 30 at least partially in this shaped end 14, movement of the bracket and lifting/lowering device assembly 92 is prevented or prohibited in an upward direction. As greater weight and tension is loaded on the rope or cable of the lifting/lowering device 20, the support member pin 30 holds the bracket and lifting/lowering device assembly 92 in place.

This arrangement also improves the installation and reduces the costs of using the bracket and lifting/lowering device assembly 92 on a safety structure 90. Current arrangements use multiple pins to mount the assembly to the support structure. These arrangements use the pin of the support member, as well as a separate pin, which often can become lost, to secure the bracket and the lifting/lowering device together. Preferred and non-limiting embodiments of the present invention provide lower costs of producing the bracket and lifting/lowering device assembly 92, and quicker installation at a work site when trying to mount the bracket and lifting/lowering device assembly 92 to the safety structure 90. Often a safety structure 90 will be used in emergency situations to pull an individual out of a hole or opening of a confined space, and time is a critical component when attempting to rescue the individual. By using only the support member pin 30 to mount the bracket and lifting/lowering device assembly 92 to the support member 32, users can quickly mount the bracket and lifting/lowering device assembly 92 and save a significant amount of time that can be used to rescue the stranded individual, especially since it does not require a separate pin, which often cannot be found in an emergency situation.

In this embodiment, the cut-out 12 includes a second shaped end 15, which provides additional protection for the user of the safety structure 90. By including the second shaped end 15, the downward motion of the bracket and lifting/lowering device assembly 92 can also be prevented or prohibited. When the support member pin 30 is inadvertently pulled or loosened from the support member 32, the support member pin 30 is also pulled from the portion 22 of the bracket and lifting/lowering device assembly 92. Although the support member pin 30 continues to hold the support member 32 in place because it is still engaged with the set of opposing mounting holes 38, the bracket and lifting/lowering device assembly 92 is no longer secured to the support member 32. By using a second shaped end 15 in the cut out 12, the bracket and lifting/lowering device assembly 92 is prevented from falling down and disengaging with the support member 32 (which may cause injury to the user of the safety structure 90). When the bracket and lifting/lowering device assembly 92 begins to fall downwardly, the support member pin 30 disengages with the first shaped end 14 of the at least one cut-out 12 and proceeds to engage within the second shaped end 15 of the cut-out 12. Further, and in another preferred and non-limiting embodiment, a portion of the support member 32, itself, may include a projection, indentation, or other structural feature that prevents the bracket and lifting/lowering device assembly 92 from falling down and disengaging with the support member 32, such that the second shaped end 15 of the cut-out 12 is not required.

Figure 7:
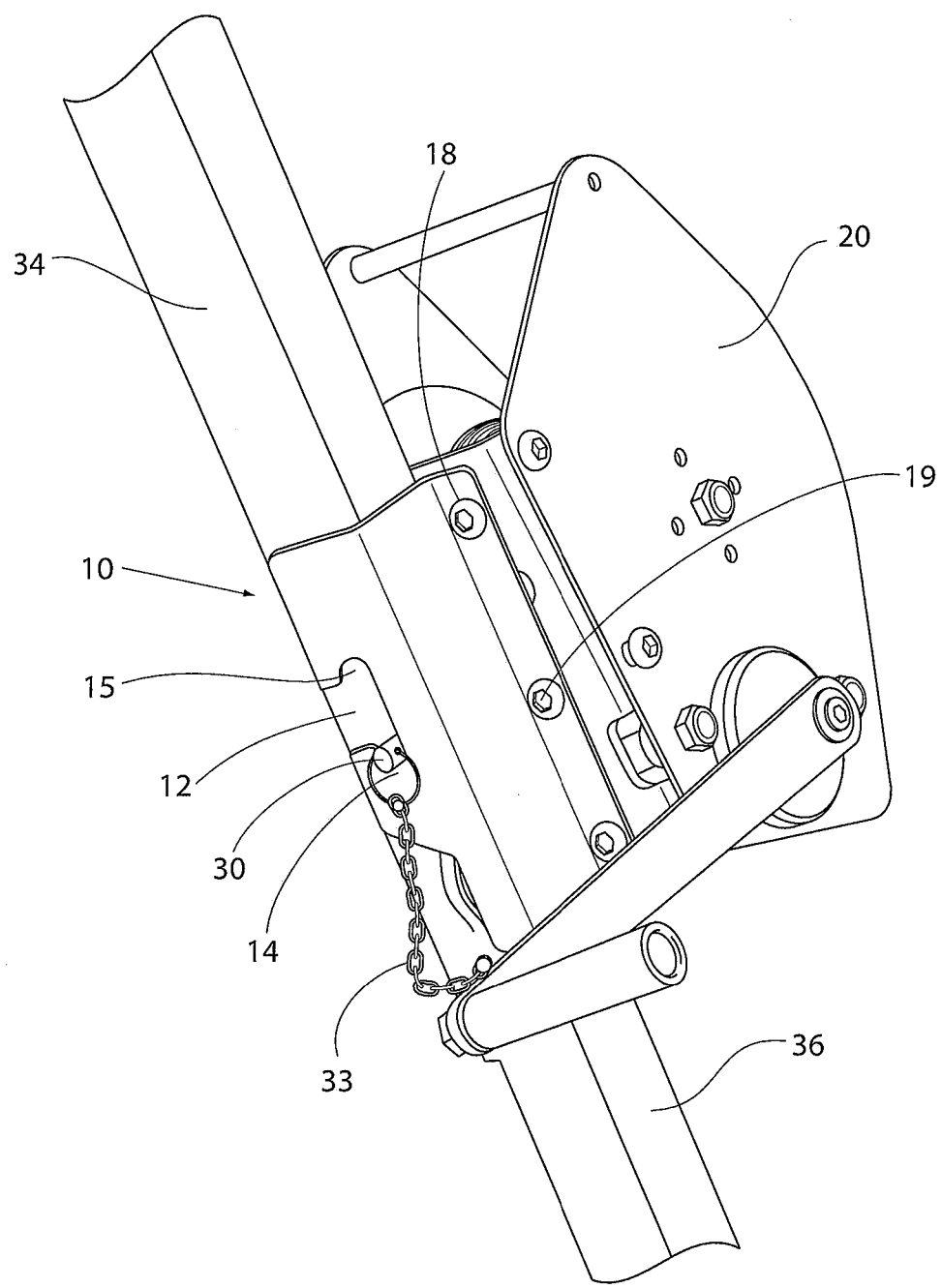
FIG. 7 is a perspective view of one embodiment of a bracket and lifting/lowering device assembly mounted to a support member of a safety structure according to the present invention.

FIG. 7 illustrates a final installation step and arrangement of the bracket and lifting/lowering device assembly 92 on the support member 32 of the safety structure 90 in accordance with a preferred and non-limiting embodiment of the present invention. In this embodiment, the support member pin 30 has been engaged with the shaped end 14 of cut-out 12 of the bracket 10. After the installation is completed, the user can begin to lift or lower an individual or object through the use of the lifting/lowering device 20. The upper support member segment 34 and the lower support member segment 36 have been locked into a desired height by the user.

Figure 8:
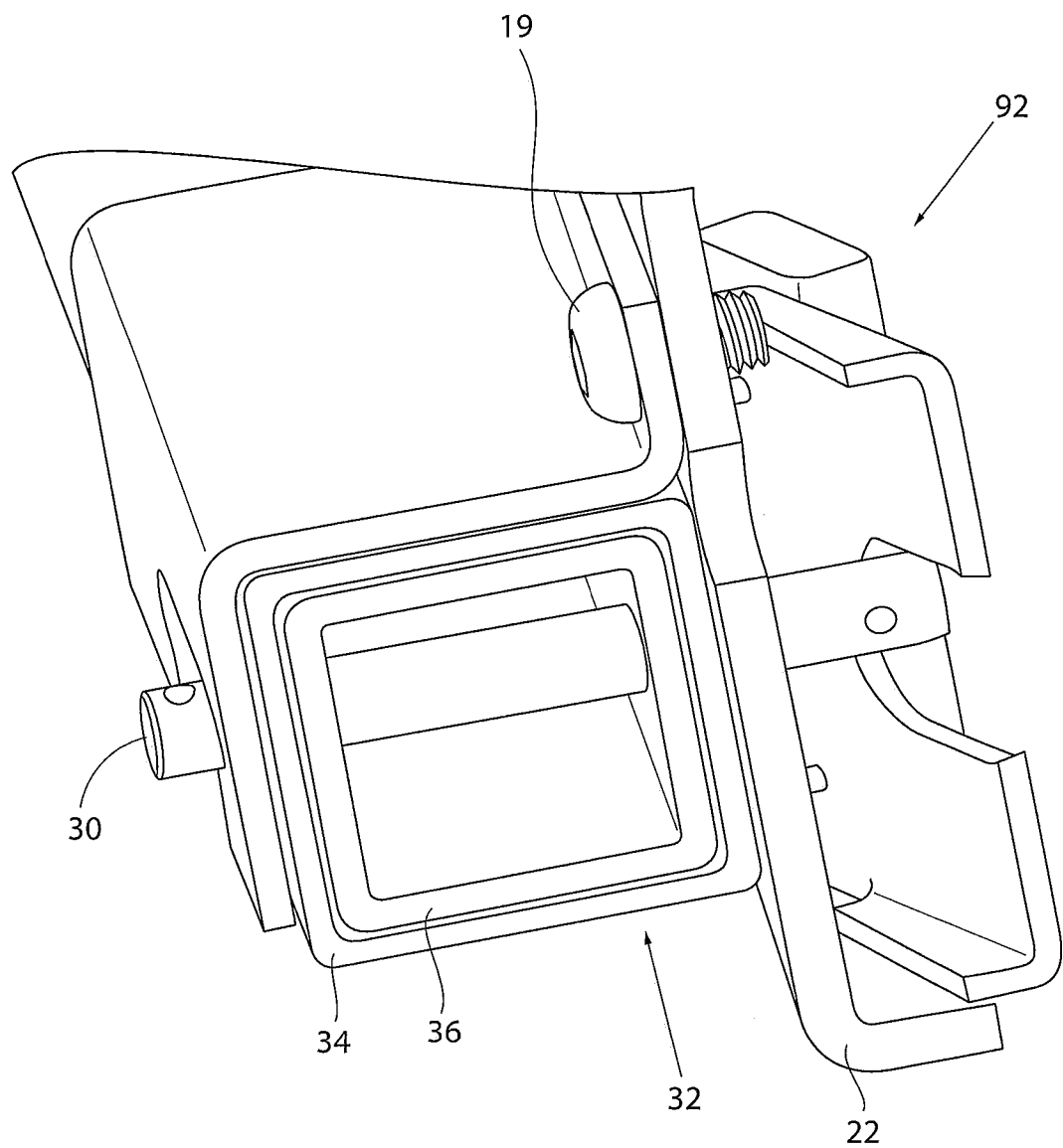
FIG. 8 is a cross-sectional view of one embodiment of a bracket and lifting/lowering device assembly mounted to a support member of a safety structure according to the present invention.
Figure 9:
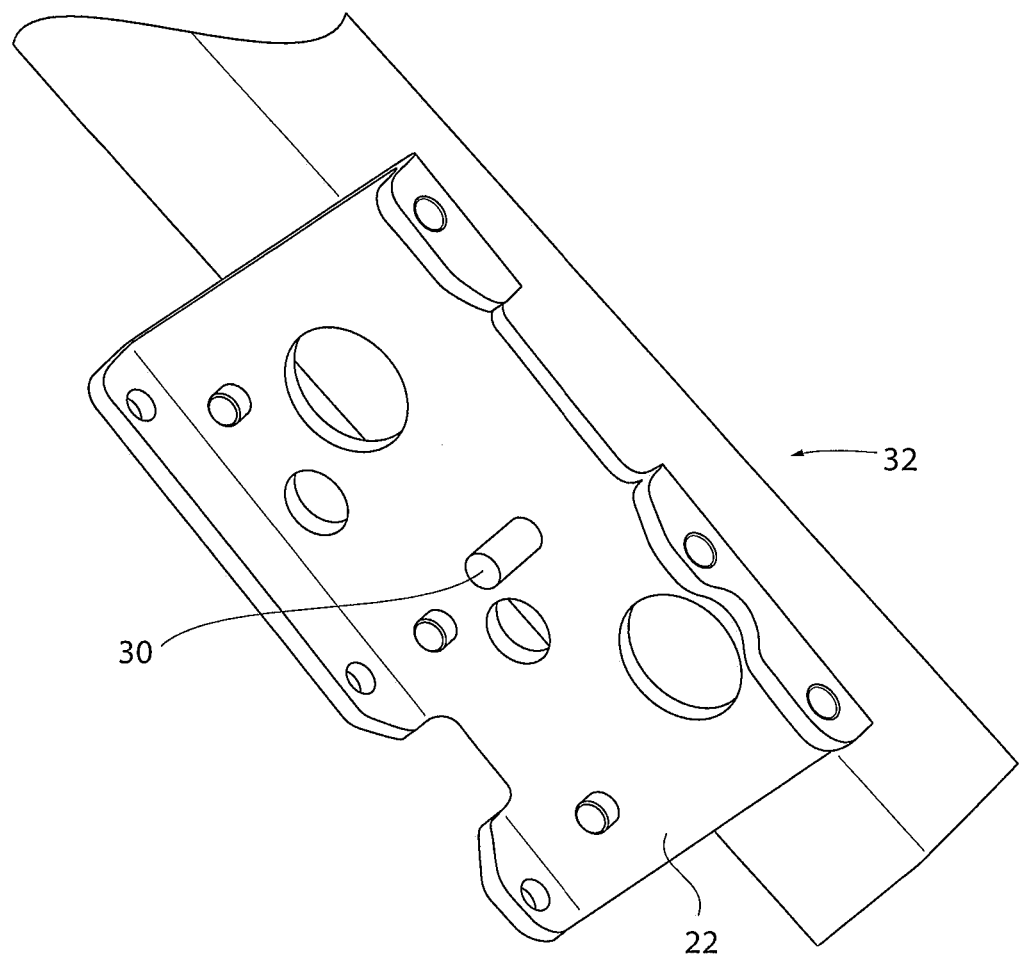
FIG. 9 is a perspective view of one embodiment of a back plate of a lifting/lowering device according to the present invention.

FIG. 8 illustrates a cross-section of the final installation arrangement of the bracket and lifting/lowering device assembly 92 mounted to the support member 32 of the safety structure 90 of FIG. 7. In particular, the bracket and lifting/lowering device assembly 92 has been mounted on the support member 32. The support member pin 30 has been inserted through the mounting holes 38 of the upper support member segment 34, the lower support member segment 36, and the portion 22 of the lifting/lowering device 20. FIG. 9 illustrates a back plate of a lifting/lowering device 20, which is mounted on a support member 32 of a safety structure 90 in accordance with a preferred and non-limiting embodiment of the present invention. In this embodiment, the portion 22 of the lifting/lowering device has been mounted to the support member 32 via the support member pin 30. The support member pin 30 has been inserted through the mounting holes 38 of the support member 32 and through a hole in the portion 22. This arrangement permits the user to use the support member pin 30 of the safety structure 90 to mount the bracket and lifting/lowering device assembly 92 to the support member 32 without the need to use additional pins.

With reference to FIGS. 3-7, and in another preferred and non-limiting embodiment, provided is a method of installing a bracket and lifting/lowering device assembly 92 on a support member 32 of a safety structure 90. Before installing the bracket and lifting/lowering device assembly 92, a safety structure 90 is positioned around the entrance to a hole, such as an entrance to a tank car, a manhole leading to an underground system, or any other confined space entrance. After the safety structure 90 has been positioned, a user extends the telescoping support members 32 of the safety structure 90 to position the safety structure 90 at a desired height. A support member pin 30 is installed a part of the way into mounting holes 38 located on a corresponding side of each of the support member segments 34, 36 to retain the support member 32 at the desired height.

After installing the support member pin 30, the user mounts the bracket and lifting/lowering device assembly 92 on the corresponding side on which the support member pin 30 has been installed. The bracket and lifting/lowering device assembly 92 is positioned to at least partially contact or envelop the support member 32 and to position the surface of the bracket and lifting/lowering device assembly 92, which includes the cut-out 12 on the corresponding side of the support member 32 where the support member pin 30 is installed. The bracket and lifting/lowering device assembly 92 is positioned below the support member pin 30 on the support member 32. The user slides the bracket and lifting/lowering device assembly 92 upwardly on the support member 32, which allows the protruding support member pin 30 to slide into the shaped end 14 of the at least one cut-out on the bracket 10. After the support member pin 30 has been positioned in the shaped end 14 of the cut-out 12, the support member pin 30 is further inserted through the mounting holes 38 in the opposing side of the support member 32 and a hole positioned on a back plate or other portion or surface of the lifting/lowering device 20.

By using this method, a user can install the bracket and lifting/lowering device assembly 92 by using only the support member pin 30, instead of using multiple pins to install the bracket and lifting/lowering device assembly 92 to the support member 32. This method provides more efficient installation of the bracket and lifting/lowering device assembly 92, reduces the installation time for the safety structure 90, and reduces the amount of parts needed to install the assembly 92 to the support member 32.

The preferred embodiments of the invention have been described in detail herein. However, it will be appreciated by those skilled in the art that various modifications and alternatives to the preferred embodiments may be made to the invention without departing from the concepts disclosed in the foregoing description. Such modifications are to be considered as included within the following claims unless the claims, by their language, expressly state otherwise. Accordingly, the particular embodiments described in detail hereinabove are illustrative only and are not limiting as to the scope of the invention, which is to be given the full breadth of the appended claims and any and all equivalents thereof.

What is claimed is:

1. A bracket for attaching a device to a support member of a safety structure, the bracket comprising:
    a body configured to at least partially contact or envelop a support member of a safety structure, the body comprising at least one surface for securing the bracket to the device,
    wherein at least one surface of the body has at least one cut-out that includes an upper shaped end and a lower shaped end, at least one of the upper shaped end and the lower shaped end configured for contacting a support member pin inserted into the support member of the safety structure,
    wherein the at least one cut-out has an open end on a peripheral edge of the at least one surface of the body such that the support member pin is insertable through the open end and into one of the upper shaped end and the lower shaped end, and
    wherein the bracket is configured to slide upwardly on the support member to position the support member pin at least partially in the lower shaped end of the at least one cut-out.

2. The bracket of claim 1, wherein the body has at least two surfaces configured to contact the support member of the safety structure.

3. The bracket of claim 1, wherein the body is shaped to substantially conform to at least a portion of the shape of the support member of the safety structure.

4. The bracket of claim 1, wherein the at least one cut-out is positioned substantially centrally on the peripheral edge of the at least one surface of the body.

5. The bracket of claim 1, wherein at least one of the upper shaped end and the lower shaped end is rounded.

6. A bracket and device assembly for use with a safety structure, comprising:
    a bracket comprising a body configured to at least partially contact or envelop a support member of a safety structure, wherein at least one surface of the body has at least one cut-out that includes an upper shaped end and a lower shaped end, at least one of the upper shaped end and the lower shaped end configured for contacting a support member pin inserted into the support member of the safety structure, wherein the at least one cut-out has an open end on a peripheral edge of the at least one surface of the body such that the support member pin is insertable through the open end and into one of the upper shape end and the lower shaped end, the body comprising at least one surface for securing the bracket to a device;
    the device; and
    the support member of the safety structure;
    wherein the support member includes at least two segments arranged telescopically together and secured together by inserting a support member pin into mounting holes of the segments, and wherein the bracket slides upwardly on the support member to position the support member pin at least partially in the lower shaped end of the at least one cut-out.

7. The bracket and device assembly of claim 6, wherein the body has at least two surfaces configured to contact the support member of the safety structure.

8. The bracket and device assembly of claim 6, wherein the body is shaped to substantially conform to at least a portion of the shape of the support member of the safety structure.

9. The bracket and device assembly of claim 6, wherein the at least one cut-out is positioned substantially centrally on the peripheral edge of the at least one surface of the body.

10. The bracket and device assembly of claim 6, wherein at least one of the upper shaped end and the lower shaped end is rounded.

11. The bracket and device assembly of claim 6, wherein the support member pin includes an attachment member for securing the support member pin to the support member of the safety structure.

12. A method of installing a bracket and device assembly on a support member of a safety structure, comprising:
(i) installing at least a portion of a support member pin into a mounting hole of a support member of a safety structure;
(ii) mounting a bracket and device assembly to the support member; wherein the bracket and device assembly comprises:
a bracket comprising a body configured to at least partially contact or envelop a support member of a safety structure, wherein at least one surface of the body has at least one cut-out that includes an upper shaped end and a lower shaped end, at least one of the upper shaped end and the lower shaped end configured for contacting or surrounding at least a portion of a support member pin inserted into the support member of the safety structure, wherein the at least one cut-out has an open end on a peripheral edge of the at least one surface of the body such that the support member pin is insertable through the open end and into the shaped end, and wherein the body comprises at least one surface for securing the bracket to a device;
the device; and
the support member of the safety structure, wherein the support member includes at least two segments arranged telescopically;
(iii) sliding the bracket and device assembly upwardly on the support member to allow the support member pin to slide at least partially into the lower shaped end of the at least one cut-out of the bracket; and
(iv) further inserting the support member pin through at least one mounting hole of the support member and a hole on a portion of the device.

13. The method of claim 12, wherein the body has at least two surfaces configured to contact the support member of the safety structure.

14. The method of claim 12, wherein the body is shaped to substantially conform to at least a portion of the shape of the support member of the safety structure.

15. The method of claim 12, wherein the at least one cut-out is positioned substantially centrally on the peripheral edge of the at least one surface of the body.

16. The method of claim 12, wherein at least one of the upper shaped end and the lower shaped end is rounded.

17. The method of claim 12, wherein the support member pin includes an attachment member for securing the support member pin to the support member of the safety structure.

* * * * *